United States Patent
Xiao et al.

(10) Patent No.: US 6,219,619 B1
(45) Date of Patent: Apr. 17, 2001

(54) INHOMOGENEOUS BACKGROUND-BASED SOFTWARE FOCUSING METHOD FOR ARRAY-TYPE INDUCTION LOGGING TOOLS

(75) Inventors: Jiaqi Xiao; Ingo Michael Geldmacher, both of Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/264,105

(22) Filed: Mar. 8, 1999

(51) Int. Cl.[7] .................................................. G06F 19/00
(52) U.S. Cl. ............................................. 702/7; 324/339
(58) Field of Search .................................... 324/339, 334; 702/7; 367/73

(56) References Cited

U.S. PATENT DOCUMENTS

| | | | |
|---|---|---|---|
| 5,210,691 | * 5/1993 | Freedman et al. | 364/422 |
| 5,774,360 | * 6/1998 | Xiao et al. | 702/6 |
| 5,841,281 | * 11/1998 | Beard et al. | 324/329 |
| 5,905,657 | * 5/1999 | Celniker | 364/578 |

OTHER PUBLICATIONS

D. R. Beard et al., A New, Fully Digital, Full–Spectrum Induction Device for Determining Accurate Resistivity with Enhanced Diagnostics and Data Integrity Verification, SPWLA 37th Annual Logging Symposium, Jun. 16–19, 1996, pp. 1–14.

Dave Beard et al., Practical Applications of a New Multichannel and Fully Digital Spectrum Induction System, 1996 SPE Annual Technical Conference and Exhibition, Denver, Colorado, SPE–36504, Oct. 6–9, 1996, pp. 99–109.

T. Barber et al., A Multiarray Induction Tool Optimized for Efficient Wellsite Operation, 1995 SPE Annual Technical Conference and Exhibition, Dallas, Texas, SPE–30583, Oct. 22–25, 1995, pp. 549–561.

T.D. Barber et al., Using a Multiarray Induction Tool To Achieve High–Resolution Logs With Minimum Environmental Effects, 66th Annual Technical Conference and Exhibition of the Society of Petroleum Engineers, Dallas, Texas, SPE–22725, Oct. 6–9, 1991, pp. 637–651.

J. Xiao et al., A Practical Dipping–Effect Correction for Multiarray Induction Tools in Deviated Wells, SPWLA 37th Annual Logging Symposium, Jun. 16–19, 1996, pp. 1–11.

J. Xiao et al., A Petrophysics–Based Resolution–Enhancement Technique for Array–Type Induction Logs, SPWLA 39th Annual Logging Symposium, May 26–29, 1998, pp. 1–14.

Q. Zhou et al., Numerical Focusing of Induction Logging Measurements, 12th workshop in electromagnetic induction in earth, International Union Geodesy and Geophysics, Aug. 8–14, 1994, Brest, France, pp. 10.

* cited by examiner

*Primary Examiner*—Donald E. McElheny, Jr.
*Assistant Examiner*—Victor J. Taylor
(74) *Attorney, Agent, or Firm*—Darryl M. Springs; Madan, Mossman & Sriram

(57) ABSTRACT

A method of focusing the measurements from an array type induction logging tool using an inhomogeneous background rather than a homogeneous background. A modeled inhomogeneous background response can be separated from the measured response and focused directly using focusing target functions. The residue, the difference between the measured response and the background response, can then be focused using conventional linear focusing methods. A final focusing response is obtained by adding the two focusing responses.

9 Claims, 11 Drawing Sheets

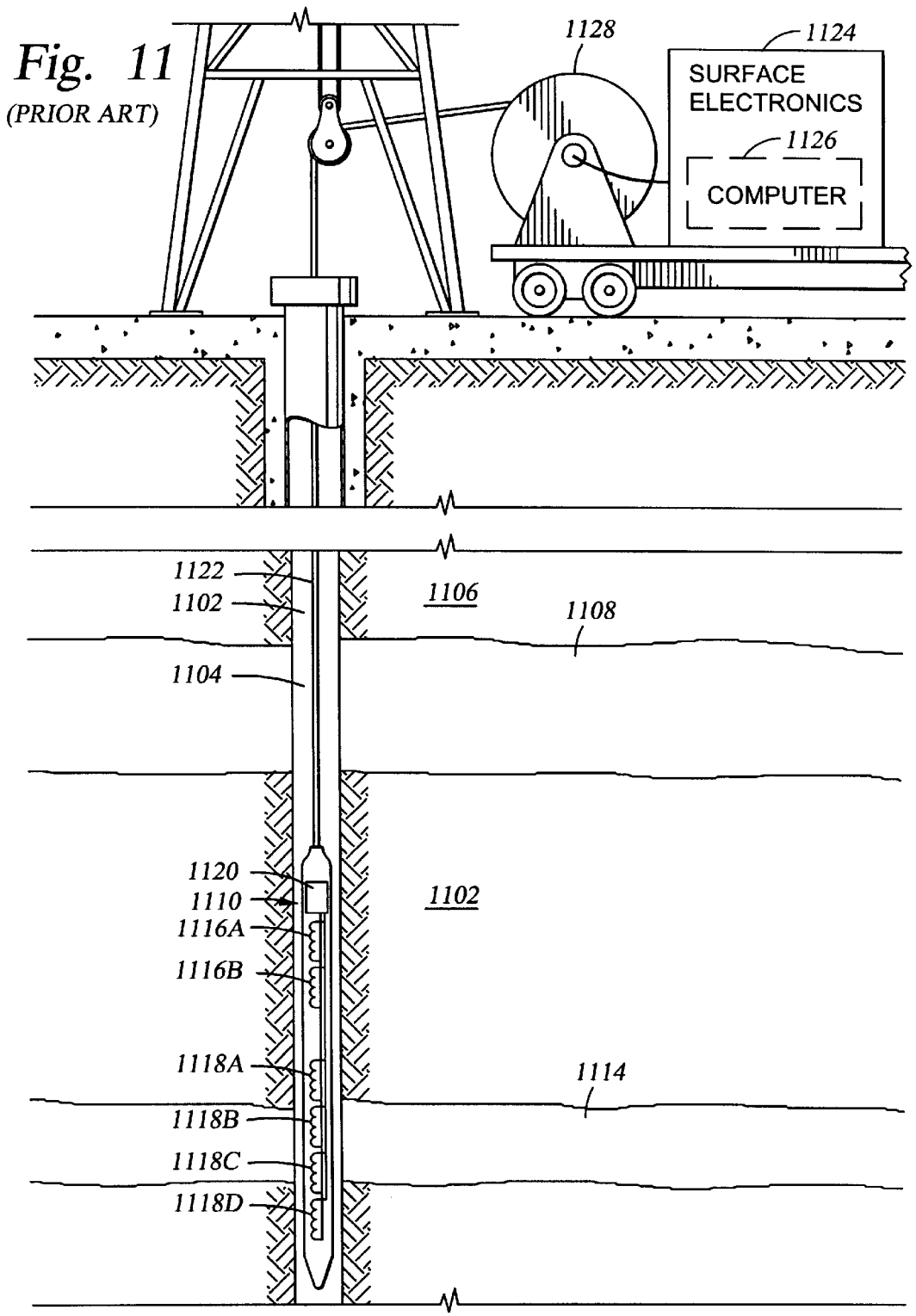

INHOMOGENEOUS BACKGROUND-BASED SOFTWARE FOCUSING METHOD FOR ARRAY-TYPE INDUCTION LOGGING TOOLS

FIELD OF THE INVENTION

The present invention relates to electromagnetic induction well logging. More specifically, the present invention relates to an improved method of focusing the measurements obtained with array-type induction logging tools.

BACKGROUND OF THE INVENTION

The production of hydrocarbons from subsurface formations typically commences by forming a borehole through the earth to a subsurface reservoir thought to contain hydrocarbons. From the borehole, various physical, chemical, and mechanical properties are "logged" for the purpose of determining the nature and characteristics, including for example, the porosity, permeability, saturation, and depth, of the subsurface formations encountered. One such logging technique commonly used in the industry is referred to as induction logging. Induction logging measures the conductivity or its inverse, the resistivity, of a formation. Formation conductivity is one possible indicator of the presence or absence of a significant accumulation of hydrocarbons because, generally speaking, hydrocarbons are relatively poor conductors of electricity. Formation water, on the other hand, typically salty, is a relatively good conductor of electricity. Thus, induction logging tools can obtain information that, properly interpreted, indicates the presence or absence of hydrocarbons.

These induction (also known as electromagnetic induction) well logging instruments were first introduced by Doll, H. G., "Introduction to Induction Logging and Application to Logging of Wells Drilled with Oil Based Mud," Journal of Petroleum Technology, June, 1949, pp. 148–62. Induction well logging instruments typically include a sonde having one or more transmitter coils and one or more receiver coils at axially spaced apart locations. Induction well logging instruments also typically include a source of alternating current (AC) which is conducted through the transmitter coils. The AC passing through the transmitter coils induces a magnetic field within the surrounding formation, causing the flow of eddy currents within the earth formations. In general, the magnitude of the eddy currents is proportional to the electrical conductivity (the inverse of the electrical resistivity) of the earth formations surrounding the instrument. The eddy currents, in turn, induce a magnetic field that is coupled to the receiver coil, thereby inducing in the receiver coil a voltage signal with magnitude and phase dependent upon the electrical characteristics of the adjacent formation.

Typically, the signal from the receiver coil is applied to one or more phase detection circuits, each of which generates a signal proportional to the magnitude of that component of the receiver coil signal having a particular, predetermined phase. Thus, one such phase detector circuit senses the magnitude of the component of the receiver coil signal that is in-phase with the transmitter current in the transmitter coil. This component signal is commonly referred to as the real or in-phase (R) component. A second phase detection circuit commonly used in induction logging tools detects the component of the receiver coil signal that is 90 degrees out of phase with the transmitter current. This latter component signal is commonly referred to as the quadrature-phase (X) component signal.

Because the output signal from the receiver coil is not itself an absolute measure of conductivity, but rather is merely proportional to the true formation conductivity, the output signal must be processed to obtain a log or plot of the true formation conductivity as a function of axial depth in the borehole. Most modern theoretical analysis of induction log processing is based upon the work of H. G. Doll which is summarized in his 1949 article. According to Doll's analysis, the in-phase component of the signal induced in the receiver coil is directly proportional to the conductivity of the surrounding formation, and the constant of proportionality, referred to by Doll as the "geometrical factor," is a function of the geometry of the tool as it relates to the portion of the formation being measured.

Doll calculated what he termed the "unit geometrical factor," which defines the relationship between the conductivity of a so-called "unit ground loop," a horizontal loop of homogeneous formational material having a circular shape with its center on the axis of the borehole and having a very small, square cross section, and the elementary voltage signal contributed by the unit ground loop to the total in-phase signal induced in the receiver coil. By integrating the unit geometrical factor across all unit ground loops lying within a horizontal plane spaced at some axial distance z from the center of the coil system, Doll obtained the geometrical factor for a "unit bed." A plot of this geometrical factor as a function of the axial distance from the center of the coil system gives what is commonly referred to as the "vertical geometrical factor' for the tool. It is an accurate plot of the sonde response function relating formation conductivity to output voltage measurements for the tool, assuming no attenuation or phase shift of the induced magnetic field as a consequence of the conductivity of the surrounding formation.

Induction logging technology has evolved significantly since its introduction by Doll. In recent years, induction devices consisting of several complex coil combinations have been replaced by tools with multiple arrays (see, for example, Beard, D. R., et al., "A New, Fully Digital, Full-spectrum Induction Device for Determining Accurate Resistivity with Enhanced Diagnostics and Data Integrity Verification," SPWLA 37th Annual Logging Symposium, June, 1996, Paper B; Beard, D. R., et al., "Practical Applications of a New Multichannel and Fully Digital Spectrum Induction System," SPE Annual Technical Conference and Exhibition, 1996, Paper No. 36504; and Barber, T. D., et al., "A Multiarray Induction Tool Optimized for Efficient Wellsite Operation," SPE 70th Annual Technical Conference and Exhibition, 1995, Paper No. 30583). Each array consists of one transmitter and a pair of receiver coils. These new induction devices are commonly referred to as array-type induction tools.

A simple induction array (two-coil array and three-coil array) responds to all its surrounding media, including formations, the borehole, and invasion zones if there are any. This response will be degraded by severe borehole effect and will suffer from low vertical and radial resolution. In order to avoid the weaknesses of the simple induction arrays, array combinations are used to increase the response contribution from the medium of interest, such as uninvaded formation, and at the same time to reduce the response contribution from the medium of disinterest, such as the borehole. This process by which the output of an induction logging instrument is made to effectively zoom in on a specific space of its surrounding medium and mute the unwanted peripherals is referred to as focusing.

The older style tools attempt to focus the tool response using carefully selected coil arrangements. The focusing therefore is fixed by the tool design, i.e. these tools are "hardware-focused". In array-type induction tools, the measurements from various arrays are combined through a software algorithm to achieve focusing of the signal response, i.e. these tools are "software-focused". This processing produces a set of curves with predetermined depth of investigation, vertical resolution and other optimized 2D features.

Using software-based focusing provides greater flexibility for handling various logging environments and for creating more reliable induction logs. However, the quality and accuracy of the final focused logs are dependant on the accuracy of the software focusing method.

The current focusing method was proposed by Barber and Zhou (see Barber, T. D. and Rosthal, R. A., "Using a Multiarray Induction Tool to Achieve High-Resolution Logs with Minimum Environmental Effects," SPE 66$^{th}$ Annual Technical Conference and Exhibition, 1991, Paper No. 22725 and Zhou, Q., Beard, D. and Tabrovsky L., "Numerical Focusing of Induction Logging Measurements," 12$^{th}$ Workshop in Electromagnetic Induction in Earth, August, 1994) and is, for reference purposes, here referred to as the "conventional focusing method". The conventional focusing method can be expressed mathematically as $$\sigma_{TRF}(z) = \sum_{i=1}^{m_{ary}} \sum_{z'=z_{min}}^{z_{max}} W_i(z')\sigma_{ai}(z-z'), \qquad (1)$$

where $\sigma_{ai}$ is the measured log from the $i^{th}$ array; $W_i$ is the focusing filter; $m_{ary}$ is the total number of arrays; and $Z_{min}$ and $Z_{max}$ define the depth window surrounding the output point.

Theoretically, the software focusing method described by equation (1) can be traced back to the Born Approximation (a linear approximation of the measured response of a medium) and then the condition for equation (1) is an assumption of an homogeneous background. Practically, the current focusing method (conventional focusing method) produces good quality focused logs when the formation conductivity varies with small to moderate contrasts between adjacent formation beds. However, when the formation conductivity varies with very large conductivity contrasts, i.e. if the formation is very "inhomogeneous", the focused logs are not as good as would be expected.

BACKGROUND

The root cause of this shortcoming is the nonlinearity of the induction response with respect to the formation conductivity. The basic assumption for the focusing algorithm expressed through Equation (1) is that the array measurements behave linearly with conductivity. The error due to the violation of this linearity assumption is referred to as the nonlinearity effect. The nonlinearity effect is formation-dependent: the larger the inhomogeneity, the stronger the nonlinearity effect. The current focusing method, based on a formation response with a homogeneous background, propagates or even amplifies the nonlinearity effect.

In a given logging environment, the inhomogeneity of a formation is described by numerous factors. Formation layering contributes to the vertical inhomogeneity, which is conventionally described by the $R_t/R_s$ contrast, where $R_t$ is the formation resistivity and $R_s$ is the shoulder resistivity. Radial inhomogeneity is expressed through the $R_t/R_{xo}$ and the $R_{xo}/R_m$ contrast, where $R_{xo}$ is the resistivity of the invaded zone and $R_m$ is the mud resistivity. Other inhomogeneities are introduced through borehole irregularity, tool eccentricity, borehole deviation, etc. Despite the multitude of factors, the vertical inhomogeneity often dominates, particularly when the $R_t/R_s$ contrast is large.

The induction logging response function varies with formation inhomogeneity due to the nonlinearity of the induction measurements. The focusing filters are designed based on Born geometric factors, which equal the response functions under a homogeneous background. With such designed filters and Equation (1), the nonlinearity effect is propagated or even amplified through the focusing process, especially when the formation is inhomogeneous with a large conductivity contrast. Therefore, a better focusing method is needed, particularly for use with inhomogeneous formations.

SUMMARY OF THE INVENTION

The present invention is a software focusing method for array-type induction logging tools using an inhomogeneous background formation model. Using this inhomogeneous background formation model, the formation response of the induction logging tool can be split into two portions: a background response, and a certain "response residue". The background response is obtained as computer simulated measurements of the inhomogeneous background model. The response residue is the difference between raw measurements and the background responses. A formation model estimated from raw array measurements or processed logs is used as the inhomogeneous background conductivity model. For the background response, the focusing result can be directly obtained by using focusing target functions instead of applying the conventional focusing processing. Therefore the focusing results of the background response is ideal and free of any nonlinearity effect. The conventional focusing procedure is applied to the response residue. The final focusing response is obtained by adding the two focusing results.

The disclosed innovations, in various embodiments, provide one or more of at least the following advantages: Due to the relatively small amplitude of the response residue, the nonlinearity effect introduced to the focused result will be very small. Hence, the nonlinearity effect on the final focusing result is largely reduced. Thus, by introducing an inhomogeneous formation background model into the focusing algorithm, an improved focusing method is achieved having a reduction in the propagation of nonlinearity effects.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 11 (PRIOR ART) shows a well logging instrument.

DETAILED DESCRIPTION OF THE PREFERRED EMBODIMENTS

Figure 1:
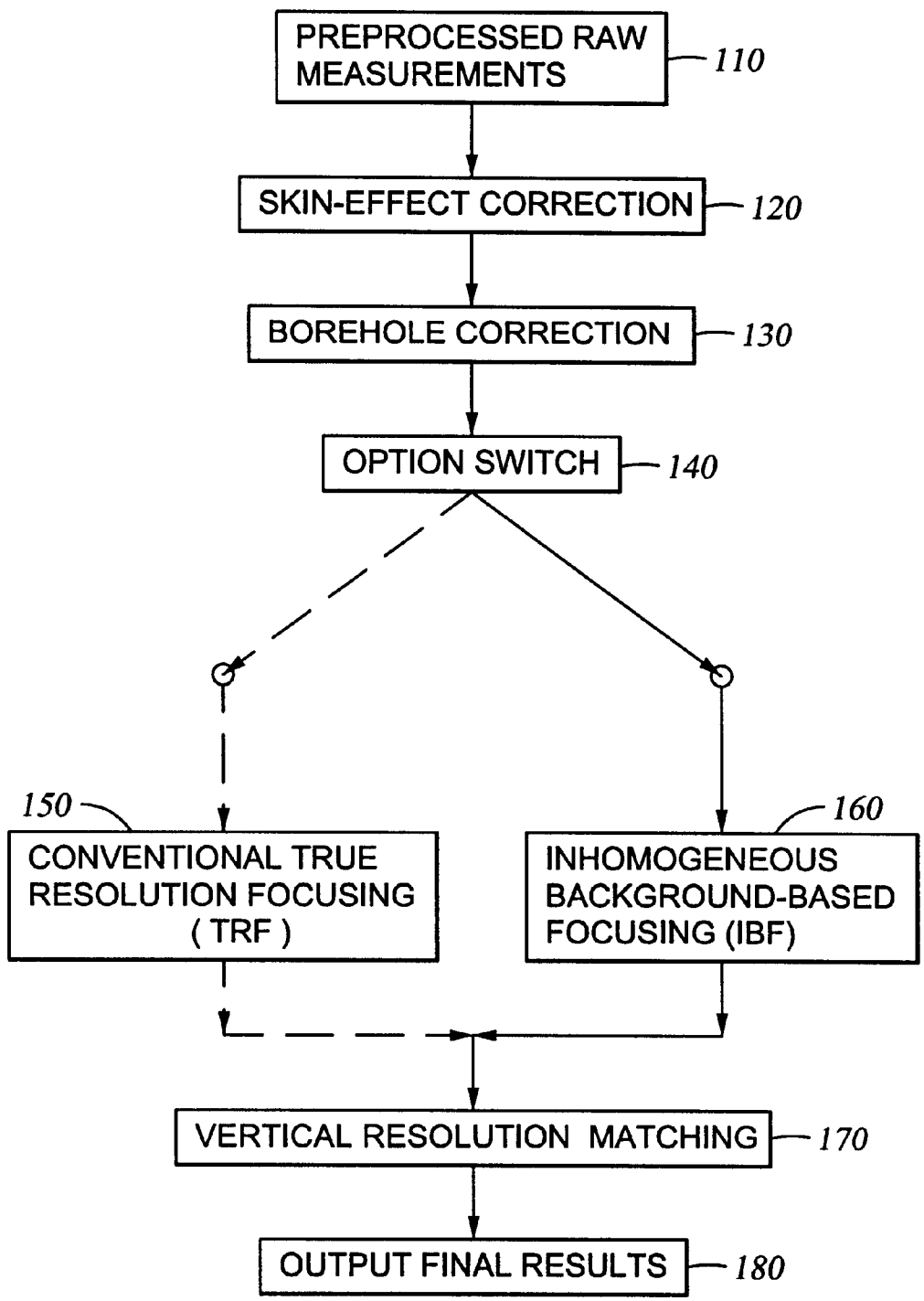
FIG. 1 shows a flowchart of HDIL focusing processing with IBF method included.

The numerous innovative teachings of the present application will be described with particular reference to the presently preferred embodiment (by way of example, and not of limitation).

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

Borehole: a deep narrow circular hole, especially one made in the earth to find water, oil, etc.

Born Approximation: a linear approximation of a detected response of a medium. An inhomogeneous medium is considered as a background plus a perturbation. The response of the inhomogeneous medium is considered, accordingly, to be the response of the background plus the response change caused by the perturbation.

Born Geometric Factors: a function that relates medium perturbation to the response change. It is normally a function of spacial position.

Conductivity: the ability of a substance (such as a formation) to conduct electrical current. It is the inverse of resistivity.

Formation (or rock formation): earth strata of a particular type of rock or a combination of different rocks surrounding a borehole.

Homogeneous: uniform; consisting of all of the same kind.

Induction: the setup of an electromotive force and current in a conductor by variation of the magnetic field affecting the conductor.

Induction Well Logging: a method of determining information about the conductivity of a formation by inducing electrical currents in the formation using electric coils situated in a borehole.

Inhomogeneous: not homogeneous; not uniform.

Oklahoma Model: a standard data set used to measure performance.

Resistivity: a measure of the resistance of a bulk material to electric current through its volume.

Response: the voltage induced in the receiver coil of an induction logging tool.

Response Function: a mathematical equation that relates the conductivity in a formation to the voltage induced in a receiver coil of an induction logging tool.

Shoulder effect: the skew in measured conductivity data due to adjacent beds. The unwanted contributions from the adjacent beds result in a measured conductivity in the target thin bed which is somewhat different from the true value.

Skin-Effect: when the formation surrounding the tool is conductive, the electromagnetic field penetrating the formation is attenuated as a consequence of resistive losses through eddy currents induced by the electromagnetic field within the conductor. This "skin-effect" tends with increasing conductivity to diminish the magnitude of the in-phase component signal induced in the receiver coil. Thus, in highly conductive formations, the sonde response function relating formation conductivity to measured output signal in the receiver coil is not strictly a function of tool and formation geometry, i.e., the vertical geometrical factor of the tool, but is also a function of the conductivity of the formation.

Skin-Effect Correction: removal of the Skin-Effect.

Sonde: an information gathering package dropped into a remote environment.

True-resolution-focusing (TRF): a software focusing method which produces a set of focused curves with optimized 2-dimensional features and natural vertical resolutions.

Well Logging: the recording of information about subsurface geologic formations, including records kept by the driller and records of mud and cutting analyses, core analysis, drill stem tests, and electric, magnetic, acoustic, and radioactivity procedures.

Inhomogeneous Background-Based Focusing Method

The conventional focusing method described by Equation (1) can be thought of as based on a homogeneous background conductivity of zero. In the conventional focusing method, the response function for each individual array is calculated and then multiplied by a weighting factor. These weighted response functions are then added together to produce a total response function. This "conventional focusing method" can be expressed mathematically (See, e.g., Barber Rosthal) as $$\sigma_{TRF}(z) = \sum_{i=1}^{m_{ary}} \sum_{z'=z_{min}}^{z_{max}} W_i(z')\sigma_{ai}(z-z'), \tag{1}$$

where, $\sigma_{ai}$ is the measured log from the $i^{th}$ array; $W_i$ is the focusing filter; $m_{ary}$ is the total number of arrays; and $Z_{min}$ and $Z_{max}$ define the depth window surrounding the output point. Because $$\sum_{i=1}^{m_{ary}} \sum_{z'=z_{min}}^{z_{max}} W_i(z') = 1,$$

a homogeneous background $\sigma_b(z)$ can be introduced for sampling position z. Then, the following focusing formula is obtained as a generalization of Equation (1):

$$\sigma_{TRF}(z) = \sigma_b(z) + \sum_{i=1}^{m_{ary}} \sum_{z'=z_{min}}^{z_{max}} W_i(z')[\sigma_{ai}(z-z') - \sigma_b(z)]. \tag{2}$$

With Equation (2), the homogeneous background conductivity $\sigma_b(z)$ does not have to be zero. The filter $W_i(z')$ now applies to $[\sigma_{ai}(z-z')-\sigma_b(z)]$ instead of $\sigma_{ai}(z-z')$. Since the background must be homogeneous, this reformulation might seem trivial to one unskilled in the art. However, extending this equation for an inhomogeneous background will make a difference.

A measurement from any single array can be expressed as $$\sigma_{ai}(z)=\sigma_{bi}(z)+[\sigma_{ai}(z)-\sigma_{bi}(z)], \tag{3}$$

where $\sigma_{bi}(Z)$ is the response of the background formation model, $\sigma_b(z)$, which is not necessarily homogeneous; and $[\sigma_{ai}(z)-\sigma_{bi}(z)]$ represents the response difference between the measurement and the numerical response of the background formation model. We refer to $[\sigma_{ai}(z)-\sigma_{bi}(z)]$ as the response residue.

Equation (3) expresses that the induction measurement can be separated into two portions: the response due to a background conductivity distribution and a component due to the residual between measurement and this "background response". With this separation, the software focusing of array-type induction measurements can be expressed as $$\sigma_{TRF}(z) = \qquad (4)$$

$$\sigma_{TRFb}(z) + \sum_{i=1}^{m_{ary}} \sum_{z'=z_{min}}^{z_{max}} W_i(z')[\sigma_{ai}(z-z') - \sigma_{bi}(z-z')],$$

where $\sigma_{TRFb}$ denotes the focusing result of the background response. The second term is the software focusing of the residual. Once the background formation model is known, its ideal focusing result can be directly determined given a certain focusing objective or target. This means $\sigma_{TRFb}$ can be obtained directly instead of through conventional focusing procedure. Typically, $$\sigma_{TRFb} = \sigma_{bfm} * \text{Target}, \qquad (5)$$

where $\sigma_{bfm}$ denotes the conductivity of the background formation model; and Target denotes the target response function of the focusing.

With Equations (4) and (5), a new focusing method is formulated. Since this method uses an inhomogeneous formation background model, it is referred to as the inhomogeneous background-based focusing method.

Due to the ideal character of $\sigma_{TRFb}$, the nonlinearity effect in the background response does not propagate into the focusing result. Therefore, any nonlinearity effect in the final focusing result is only derived form the second term in Equation (4), the focusing response of the residual.

If the background formation model is the true formation model, the response residual will be zero. The final focusing result $\sigma_{TRF}$ equals $\sigma_{TRFb}$, which is the ideal case, and where any nonlinearity effect is completely removed.

If the background formation model is homogeneous, $\sigma_{TRFb}$ is a constant and equal to the background conductivity, $\sigma_b$. Thus, Equation (4) turns into Equation (2).

In practice, it is extremely difficult to obtain the true formation model. If the true formation model is obtained, on the other hand, no focusing is needed any more. In general, an initial formation model can be obtained from the conventional focusing results. With this initial formation model as the background, a large portion of the total formation response is already accounted for in the background response. A relatively small response residual remains to be processed through conventional focusing. Therefore, the overall nonlinearity effect is largely removed and the final focusing results are improved.

Obviously, the closer the background formation model approaches the true formation model, the better the final focusing results will be. A very good background formation model may be obtained through inversion processing, which is normally very time consuming. Fortunately, the conventional focusing method produces a reasonable first approximation, even when the formation conductivity varies with moderate contrasts. This implies that the background formation model is not necessarily very close to the true formation model. Experiments with synthesized data and field data show simple initial models are adequate for improving the focusing results to a level of acceptance.

Alternative Embodiment: Iterative Method

When a curve is used to guess the initial formation model, the better the curve represents the true formation model, the closer the initial model is to the true formation model. Focusing processing produces curves which better present the true formation than raw array measurements. So, if the focusing results are used for the initial guess, a better initial model can be obtained. With a better formation background model, better focusing results can be achieved. Thus, the inhomogeneous background-based focusing method can be used iteratively.

Computer Implementation and Application to HDIL

The High Definition Induction Logging (HDIL) tool (described by Beard, D. R., et al., "A New, Fully Digital, Full-Spectrum Induction Device for Determining Accurate Resistivity with Enhanced Diagnostics and Data Integrity Verification," SPWLA 37$^{th}$ Annual Logging Symposium, June, 1996, Paper B; Beard, D. R., et al., "Practical Applications of a New Multichannel and Fully Digital Spectrum Induction System," SPE Annual Technical Conference and Exhibition, 1996, Paper No. 36504; and Xiao, J., et al., "A Petrophysics-Based Resolution-Enhancement Technique for Array-Type Induction Logs," SPWLA 39$^{th}$ Annual Logging Symposium, May, 1998, Paper XX; all of which are hereby incorporated by reference) is a typical array-type induction logging tool, which measures the formation conductivity simultaneously with seven arrays at eight operating frequencies.

Fifty-six (real-component) logging curves are acquired. With this large amount of data as input, a software algorithm produces a set of induction logs of pre-specified depth of investigation, vertical resolution and other optimized 2D features through the following steps:

Skin Effect Correction (SEC) reduces the 56 measurements to 7 frequency-independent curves;

Borehole Correction (BHC) eliminates the environmental effects on the SEC curves;

True-resolution-focusing (TRF) generates 7 curves of pre-specified depths of investigation and symmetry, with minimum borehole and near borehole effects;

Vertical Resolution Matching (VRM) enhances the curves to predetermined vertical resolutions of 0.5 foot, 1 foot, 2 feet, and/or 4 feet.

Because Equation (1) is used in the true-resolution-focusing, the final processed logs show not as good a quality as one would expect, particularly when the formation is severely inhomogeneous with large conductivity contrasts between adjacent formation beds.

New HDIL Data Processing Flow

The inhomogeneous background-based focusing method is implemented and can be used in place of the conventional true-resolution-focusing. Together with other HDIL processing procedures, a new HDIL data processing flow is formulated and described in FIG. 1. Preprocessed raw measurements (step 110) are received. Using the HDIL tool described by Beard et al. and Xiao et al., fifty-six logging curves are produced. Next, skin-effect corrections (SEC) are made (step 120) to the measurements, reducing the fifty-six measurements to seven frequency independent curves. This step is followed by a borehole correction (step 130) to the measurements which eliminates the environmental effects on the SEC curves. At this point, an option switch (step 140), which will be further described, determines whether the measurements should be processed using conventional true-resolution-focusing (TRF) (step 150) or inhomogeneous background-based focusing (IBF) (step 160). After focusing (steps 150 and 160), vertical resolution matching (step 170)

is performed to enhance the curves to pre-determined vertical resolutions of, for example, 0.5 foot, 1 foot, 2 feet, and/or 4 feet. Finally, the results are sent to a display for analysis and/or are recorded for further analysis or processing (step 180).

Inhomogeneous Background-based Focusing Method Flow

Figure 2:
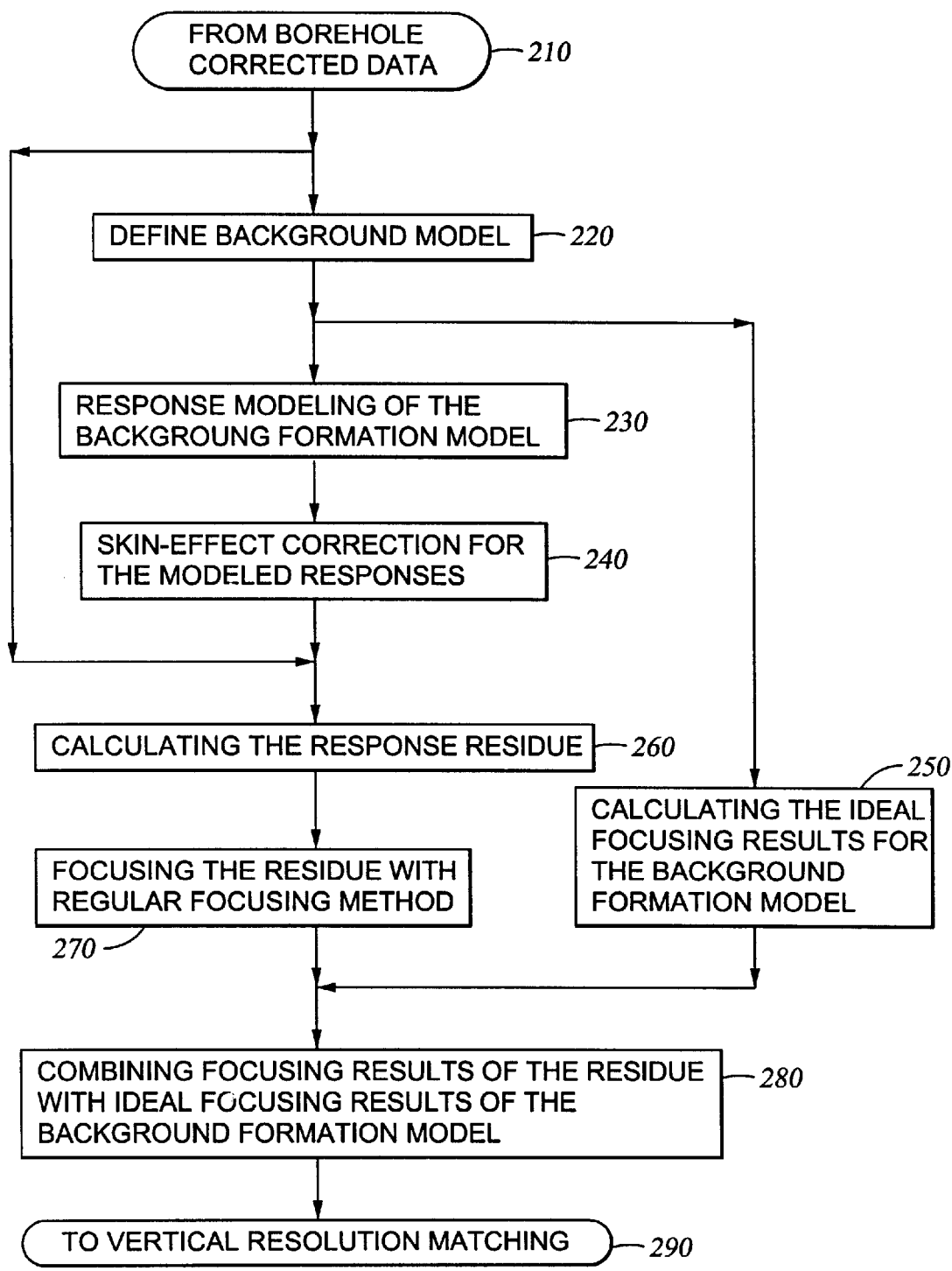
FIG. 2 shows a flowchart of HDIL inhomogeneous background-based focusing.

As described previously, an option switch (140) determines whether TRF (step 150) or IBF (step 160) focusing will be used. The details of this option step (Step 140) and the TRF (step 150) and IBF (step 160) procedures are described with reference to FIG. 2 which shows a flowchart of the inhomogeneous background-based focusing method. The first step is to take the borehole corrected data (step 210) and define a background formation model (step 220). Next, the responses of the background model are computer simulated (step 230) giving a modeled response. Then the simulated responses of the background are corrected for the skin-effect (step 240) using prior art methods giving a skin-effect corrected response. Next, using the borehole corrected data (step 210) and the skin-effect-corrected simulated responses (step 240), the response residue is calculated (step 260) as a difference between the former and the latter. The residual is then focused using the TRF procedure (step 270) given by eq. (2) to give a focused residual. Using the background formation model (step 220), the ideal focusing results for the background formation model are calculated (step 250) using eq. (5). Next, the focused results of the residual from 270 are combined with the ideal focused results of the background (step 280) using eq. (4). These combined results are then used for the vertical resolution matching, (step 290).

Performance

With the inhomogeneous background-based focusing (IBF) method, the Oklahoma model and some other benchmark models have been tested. Generally speaking, the final results are all improved. Field data testing shows the same performance. Using the Oklahoma model as an example, some intermediate results are shown and the final TRF and VRM results are compared when conventional processing is performed and when the inhomogeneous background-based focusing method is performed.

Figure 3:
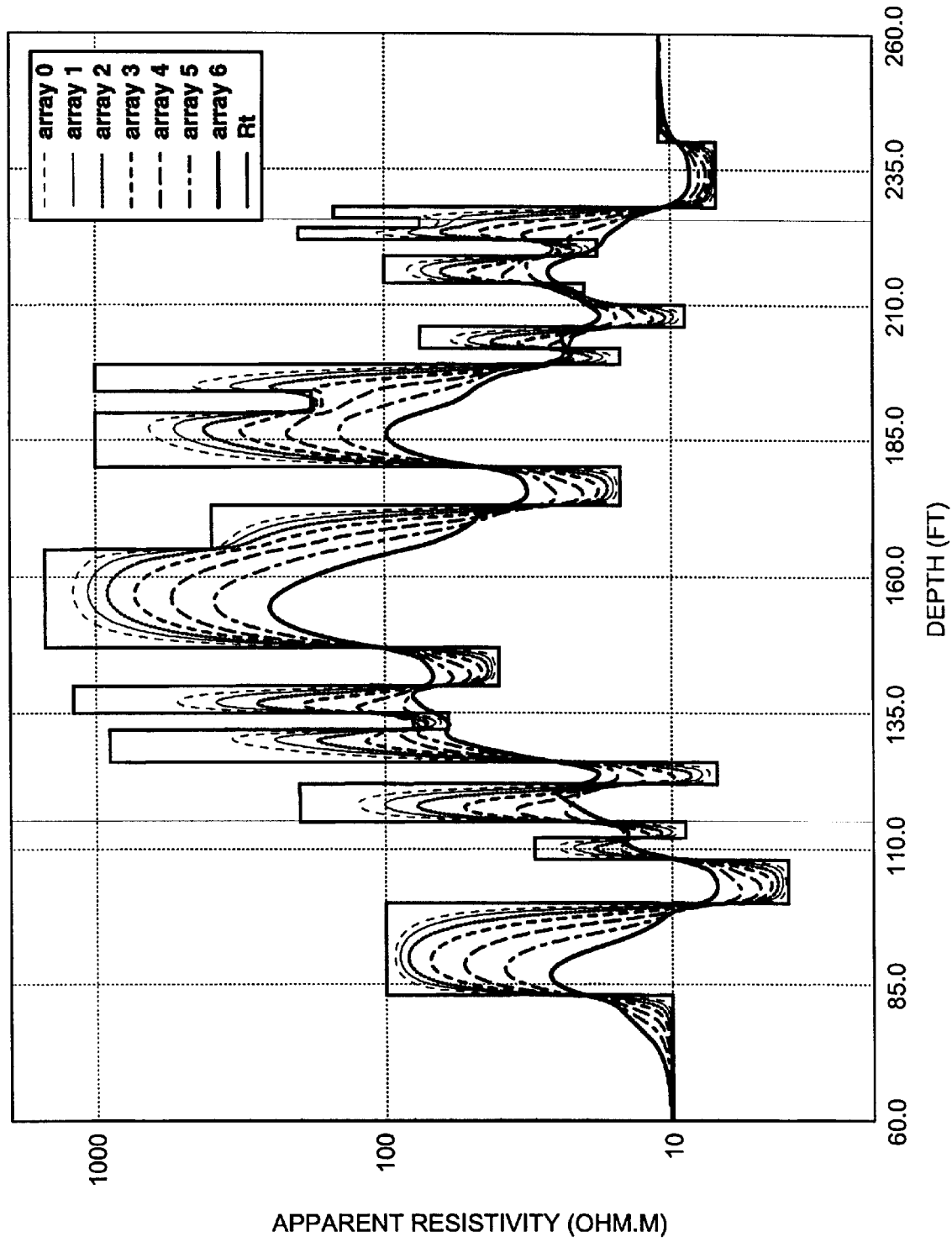
FIG. 3 shows the Oklahoma formation model and its skin-effect corrected HDIL curves.
Figure 4:
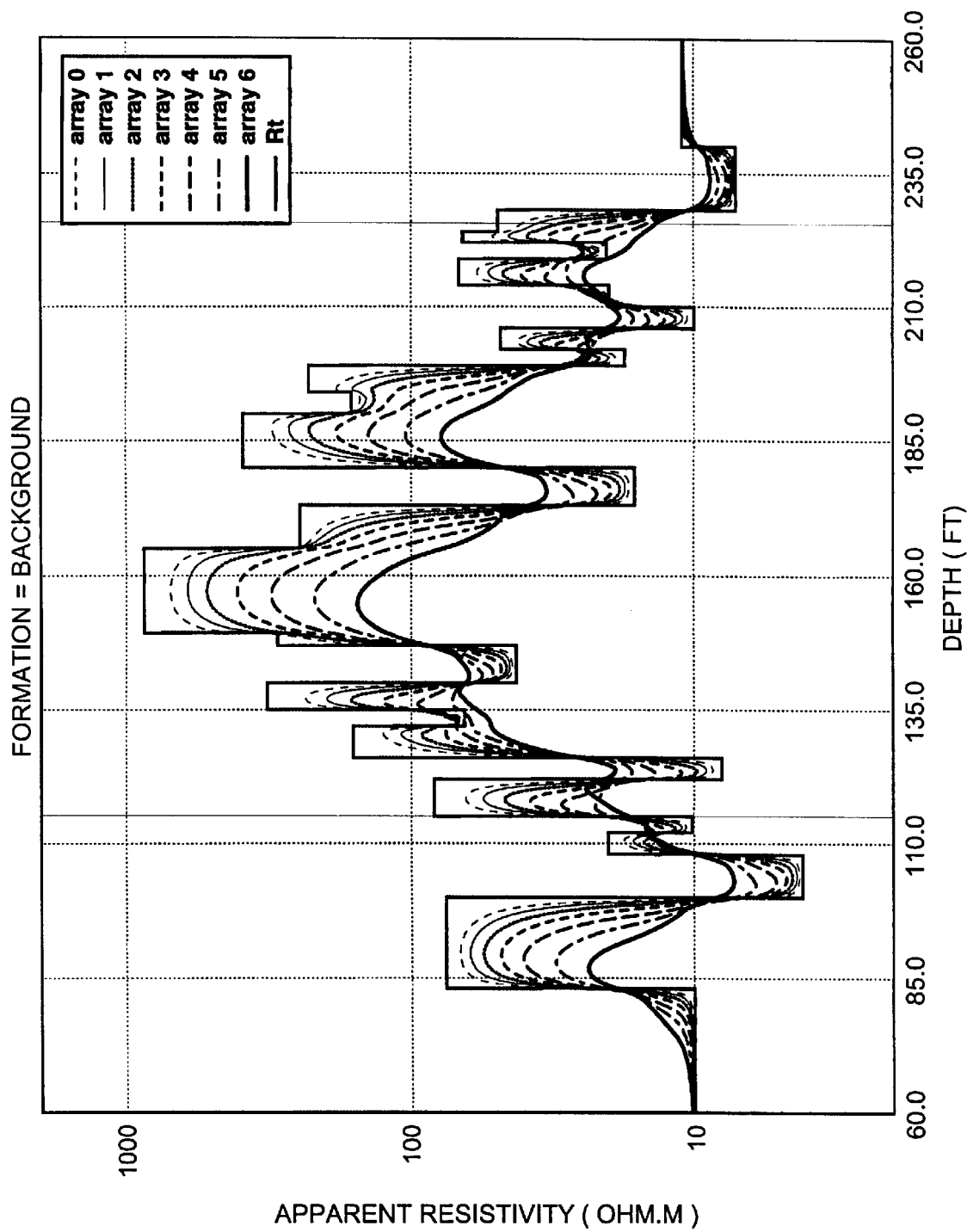
FIG. 4 shows the estimated background model and its skin-effect corrected HDIL.

FIG. 3 shows the Oklahoma formation model and its skin-effect corrected HDIL curves. These curves are obtained through forward modeling and skin-effect correction. FIG. 4 shows the estimated background model and its skin-effect corrected HDIL curves. Even with a simple initial guess, the background formation model is very close to the true formation model.

Figure 5:
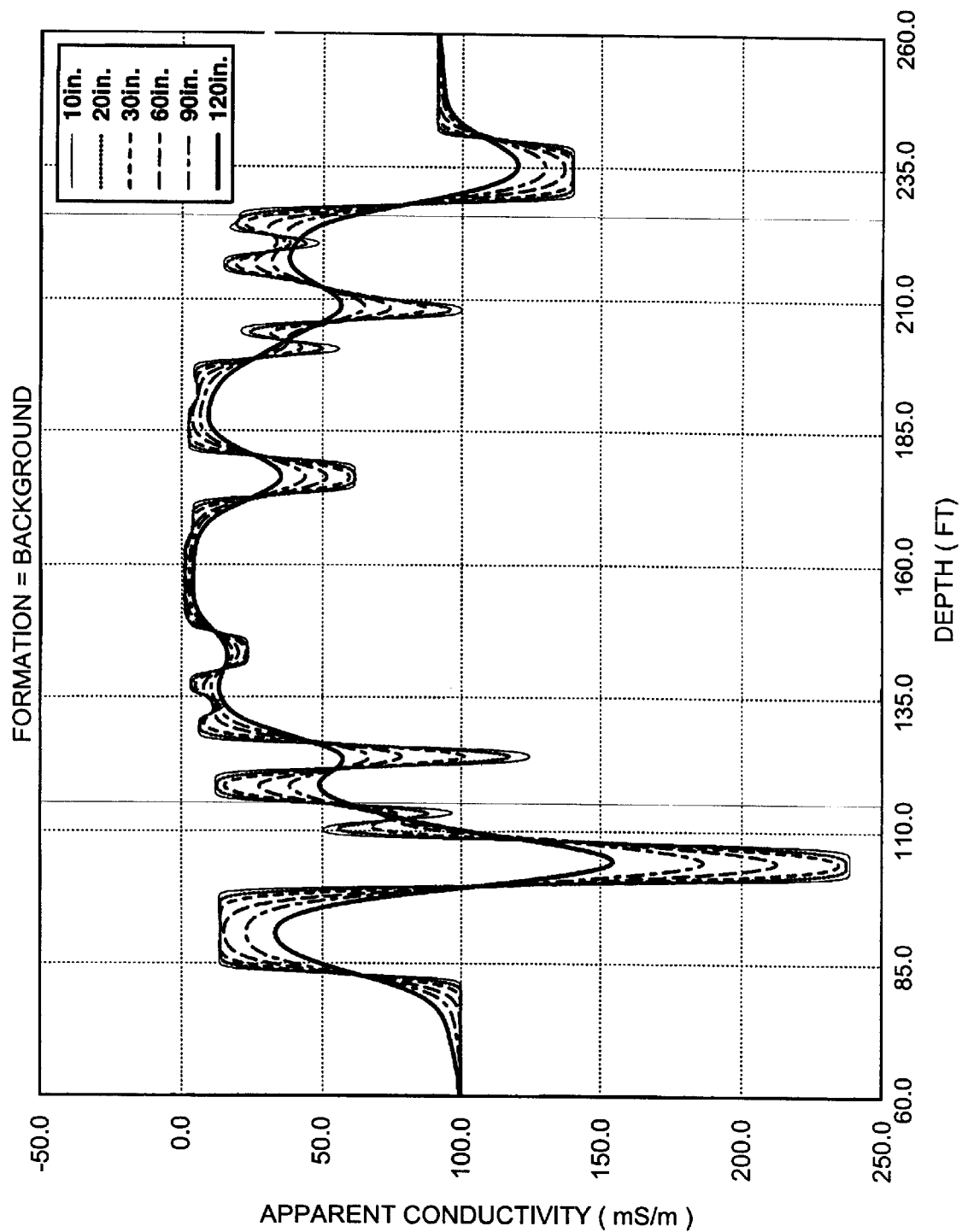
FIG. 5 shows the directly calculated focused curves of the background formation model.
Figure 6:
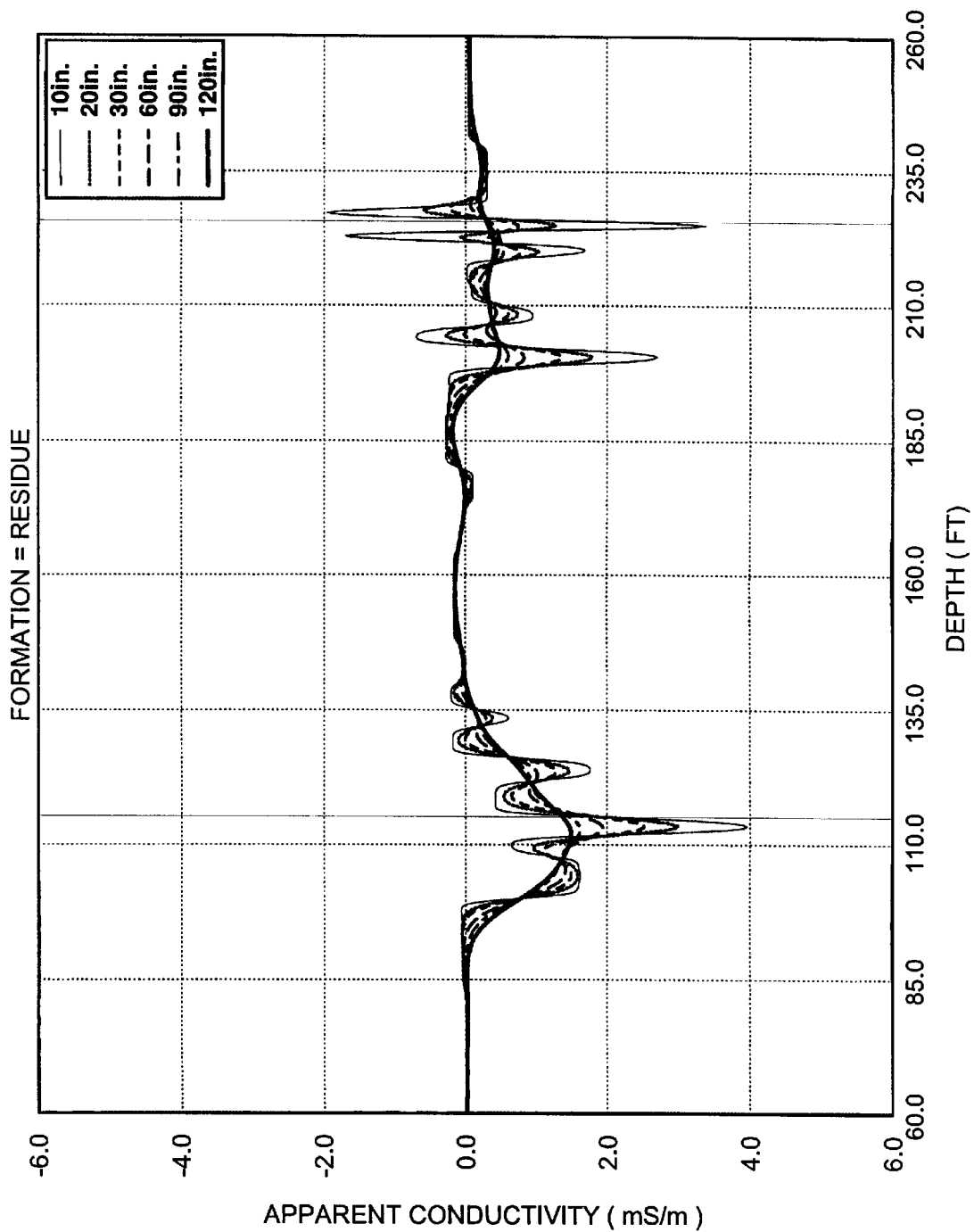
FIG. 6 shows the focused results of the response residual.

FIG. 5 shows the directly calculated focused curves of the background formation model. FIG. 6 shows the focused results of the response residual. The focused residual is very small in comparison with the focused curves of the background formation model.

Figure 7:
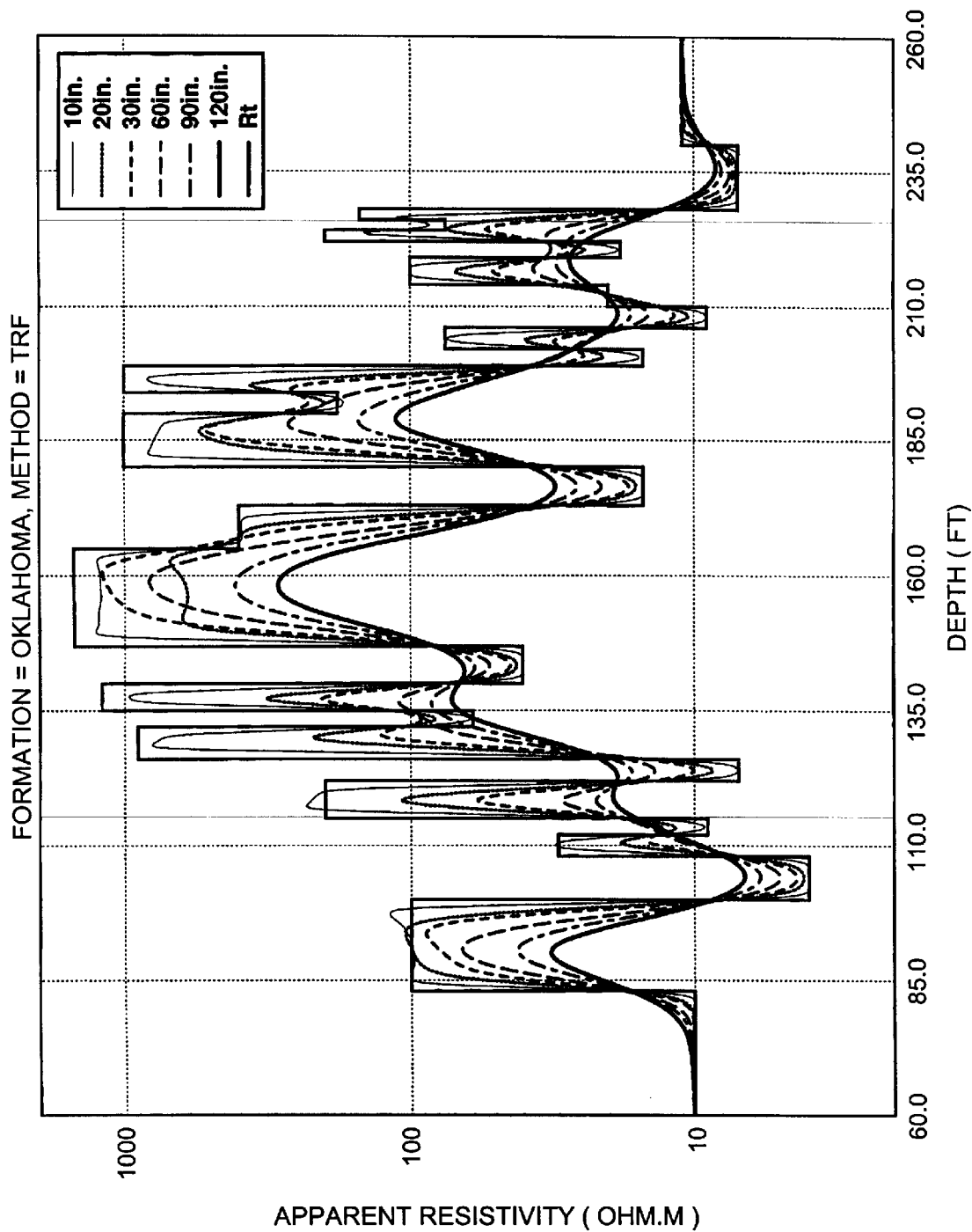
FIG. 7 shows the focusing result processed with the conventional focusing method.
Figure 8:
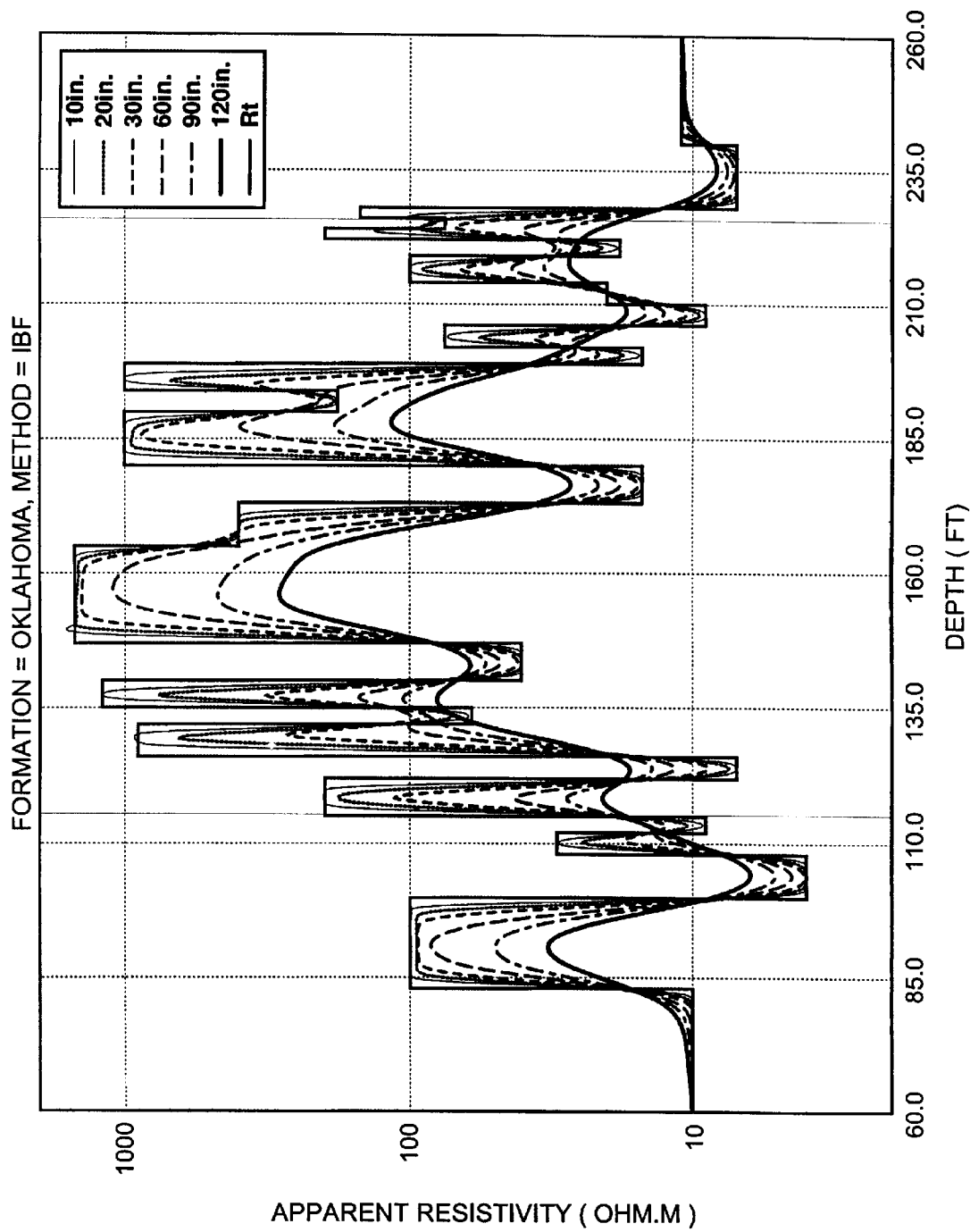
FIG. 8 shows the focusing results with the inhomogeneous background-based focusing (IBF) method.

FIG. 7 shows the focusing result processed with the conventional focusing method. FIG. 8 shows the focusing results with the inhomogeneous background-based focusing (IBF) method.

Figure 9:
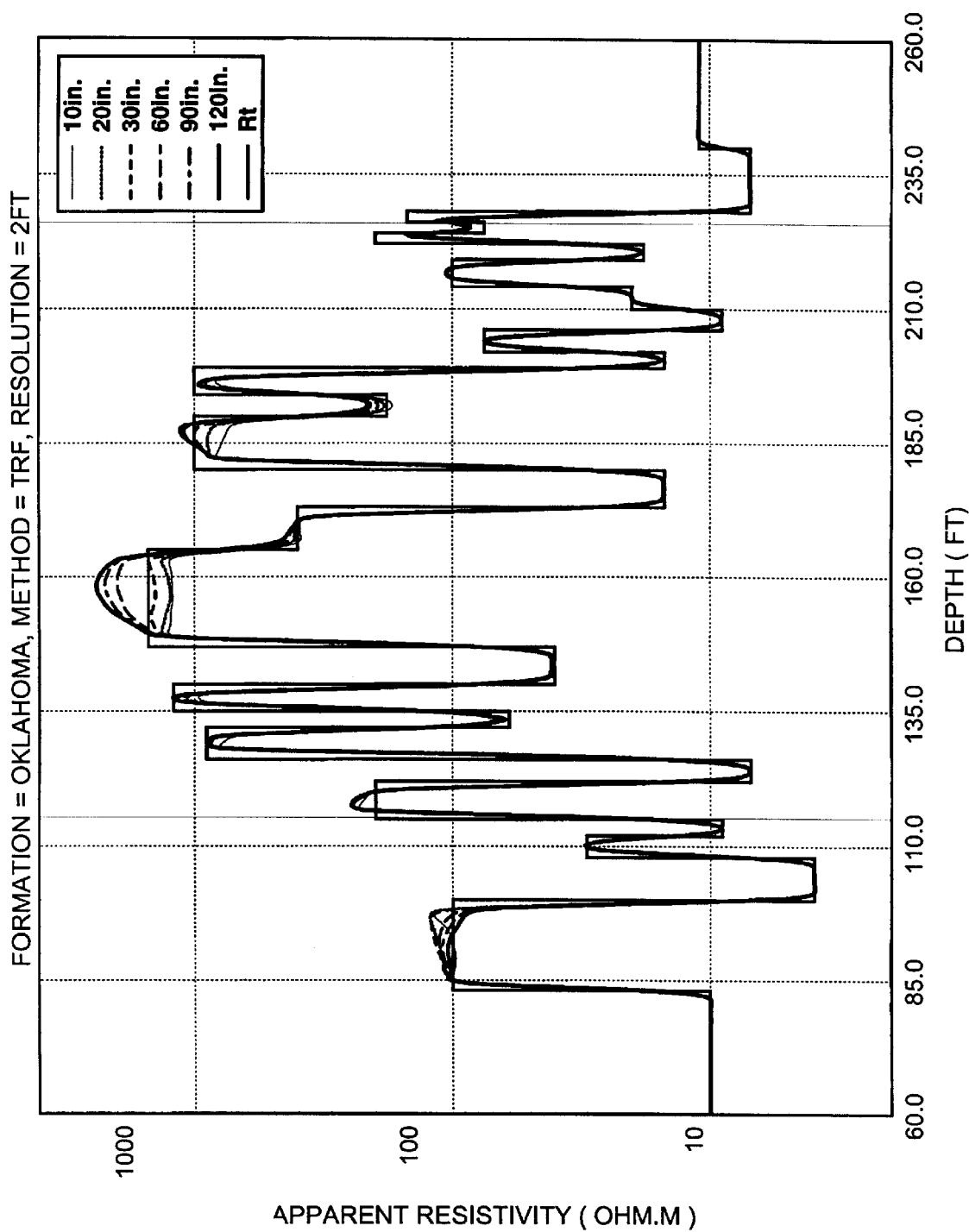
FIG. 9 shows the vertical resolution matched curves when the conventional focusing method is used.
Figure 10:
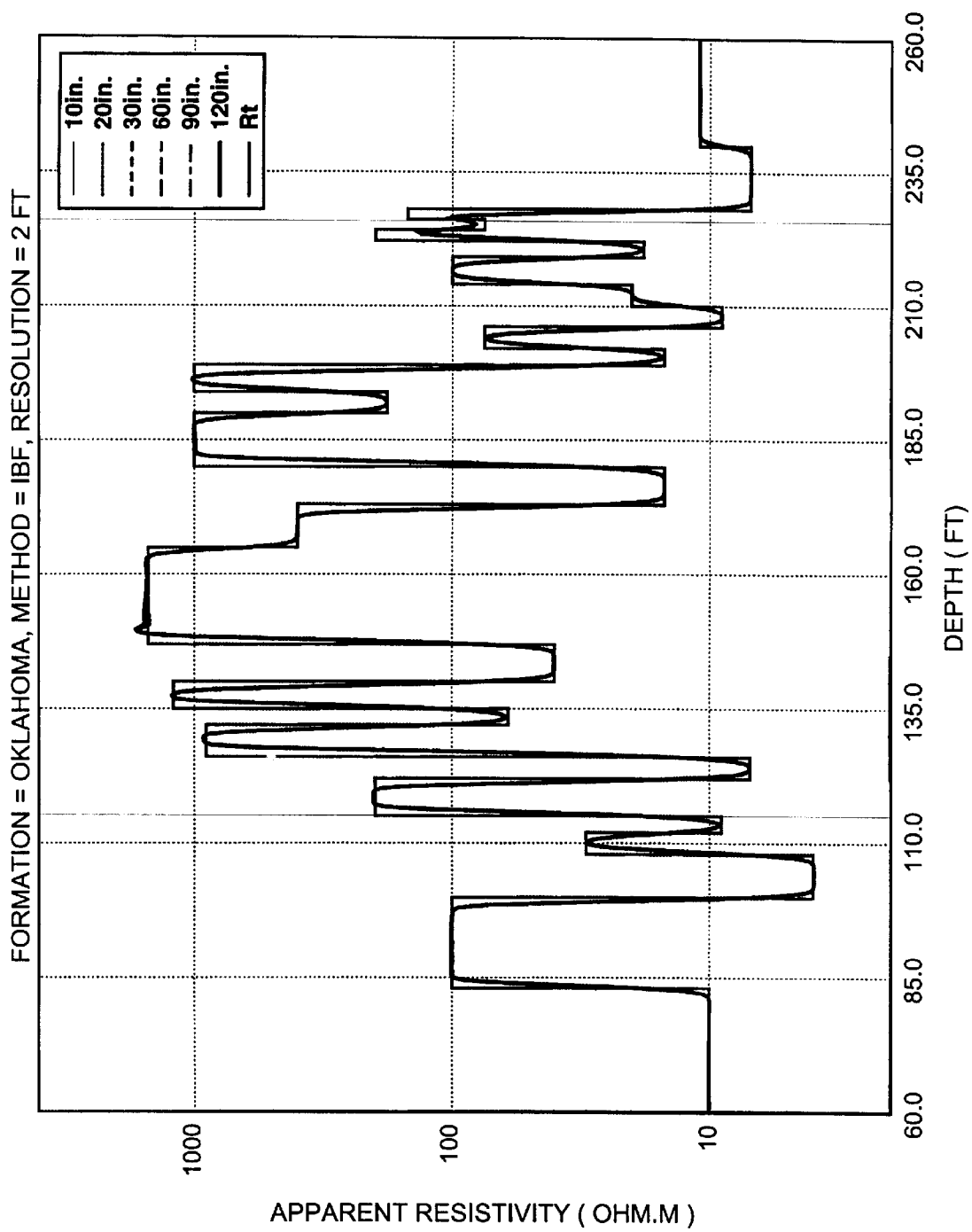
FIG. 10 shows the vertical resolution matched curves when the inhomogeneous background-based focusing method is used.

FIG. 9 shows the vertical resolution matched curves when the conventional focusing method is used, while FIG. 10 shows the vertical resolution matched curves when the inhomogeneous background-based focusing method is used. Comparing the curves in FIG. 9 and in FIG. 10, one can easily see the advantages of the inhomogeneous focusing method over the conventional focusing method.

The conventional focusing scheme for array-type induction logging tools assumes that the array measurements behave linearly with conductivity. This is an assumption that does not hold true in inhomogeneous formations. The focusing filters are designed based on Born geometric factors, which equal the response functions for a homogeneous background and mask the nonlinearity effect in the response function. The nonlinearity effect is formation-dependent, i.e., the larger the inhomogeneity, the stronger the nonlinearity effect. The current focusing methods, based on a homogeneous formation background, propagate or even amplify the nonlinearity effects. Therefore, when the formation is inhomogeneous with large conductivity contrasts, the nonlinearity effect is even further aggravated in the focusing results.

With an inhomogeneous background formation model, the induction measurement can be separated into two portions: the response due to a background conductivity distribution and the residual between measurement and this "background response". For the background response, the focusing result can be directly obtained with focusing target functions instead of through conventional focusing processes. Therefore, the focusing result of the background response is ideal and free of nonlinearity effects. The response residual will be processed through the conventional focusing procedure. Due to the relatively small amplitude of the residue signal, however, the nonlinearity effect introduced to the focused result will be very small. Hence, the nonlinearity effect on the final focusing result is largely reduced.

An initial formation model estimated from raw array measurements or processed logs can be used as the background conductivity in the inhomogeneous background-based focusing method. Experiments with benchmarks and field data show that the initial formation model, such as a squared HDIL 20in-TRF curve, works quite well as the background formation model. It should be noted that the background formation model does not have to be close to the true formation model for the method to work, but, the performance of the inhomogeneous background-based focusing method improves as the background formation model comes closer to the true formation model.

Induction Logging Instrument

FIG. 11 shows an example of an induction well logging instrument 1110 suitable for taking measurements that are compatible with the presently disclosed focusing methods. This instrument is given only to serve as an example of, and is not meant to be an exclusive representation of an induction well logging instrument suitable for performing the presently disclosed novel methods and is therefore not to be construed as a limitation on the presently disclosed methods. The induction well logging instrument 1110 is disposed in a wellbore 1102 drilled through earth formations. The earth formations are shown generally at 1106, 1108, 1112, and 1114. The instrument 1110 is typically lowered into the wellbore 1102 at one end of an armored electrical cable 1122, by means of a winch 1128 or similar device known in the art. An induction well logging instrument which will generate appropriate signals for performing the methods of the present invention is described, for example, in U.S. Pat. No. 5,452,761 issued to Beard et al. which is hereby incorporated by reference.

The instrument 1110 can include a telemetry/signal processing unit 1120 (SPU). The SPU 20 can include a source of alternating current (not shown separately). The alternating current is generally conducted through transmitters 1116A–1116B disposed on the instrument 1110. Receiver arrays 1118A–1118D can be disposed at axially spaced apart locations along the instrument 1110. The SPU 1120 can also include receiver circuits (not shown separately) connected to the receivers 1118A–1118D for detecting voltages induced in each one of the receivers 1118A–1118D. The SPU 1120 can also impart signals to the cable 1122 corresponding to the magnitude of the voltages induced in each of the receivers 1118A–1118D. It is to be understood that the number of transmitters and receivers, and the relative geometry of the transmitter and receivers shown in the instrument 1110 is not meant to be a limitation on the present methods. It is also to be understood that each receiver 1118A–1118D can comprise either a single wire coil, or can comprise multiple coils electrically interconnected to reduce the effect of direct electromagnetic coupling from the transmitters 1116A–1116B.

As is understood by those skilled in the art, the alternating current passing through the transmitters 1116A–1116B induces eddy currents in the earth formations 1106, 1108, 1112, 1114. The eddy currents correspond in magnitude both to the electrical conductivity of the earth formations 1106, 1108, 1112, 1114 and to the relative position of the particular earth formation with respect to the transmitters 1116A–1116B. The eddy currents in turn induce voltages in the receivers 1118A–1118D, the magnitude of which depends on both the eddy current magnitude and the relative position of the earth formation with respect to each individual receiver 1118A–1118D. The voltages induced in each receiver 1118A–1118D correspond to apparent electrical conductivity of all of the media surrounding the instrument 1110. The media include the earth formations 1106, 1108, 1112, and 1114 and the drilling mud 1104 in the wellbore 1102.

The signals corresponding to the voltages in each receiver 1118A–1118D (generated by the SPU 1120) can be transmitted along the cable 1122 to surface electronics 1124. The surface electronics 1124 can include detectors (not shown) for decoding the signals transmitted from the instrument 1110, and a computer 1126 to perform the presently disclosed novel methods on the signals transmitted thereto.

According to a disclosed class of innovative embodiments, there is provided: a method for determining information about earth formations, comprising: splitting an observable into a background component and a residual component, wherein said residual component is much smaller than said background component; obtaining a modeled background response for said background component; focusing said residual component to obtain a focused residual; and combining said modeled background response to said focused residual to obtain a focused observable.

According to another disclosed class of innovative embodiments, there is provided: a method of data collection, comprising: estimating a background response and a response residue; directly obtaining a focused background from said background response using focusing target functions; obtaining a focused residue from said response residue using a linear focusing algorithm; and combining said focused background to said focused residue to obtain a final focused response.

According to another disclosed class of innovative embodiments, there is provided: a method of focusing, comprising the steps of: (a.) splitting a measurement into a background response and a residue; (b.) focusing said residue using conventional focusing techniques; (c.) calculating an ideal focusing result using inhomogeneous background model and focusing target functions; (d.) combining the results from steps (b.) and (c.).

According to another disclosed class of innovative embodiments, there is provided: a method for determining conductivity of earth formations, comprising: estimating an initial background formation model; obtaining a modeled response for said background; making skin-effect corrections for said modeled response; calculating a response residual; focusing said residual using True-resolution-focusing; calculating an ideal focused result for said background; combining the results of said focusing said residual step with said ideal focused result; and performing Vertical Resolution Matching process to said combined results.

According to another disclosed class of innovative embodiments, there is provided: a method of data collection, comprising: taking a measurement; estimating a background; simulating a background response for said background; calculating a response residue; focusing said response residue with a focusing procedure; calculating a focusing result of said background; and combining results of said focusing step and said calculating a focusing result of said background step to obtain a focused measurement.

According to another disclosed class of innovative embodiments, there is provided: a system for making geophysical measurements, comprising: an induction logging tool to make geophysical measurements having at least one transmitter and at least one receiver array; and a computing device programmed to perform inhomogeneous background based focusing on said measurements made by said induction logging tool.

According to another disclosed class of innovative embodiments, there is provided: a system for making geophysical measurements, comprising: an induction logging tool to make geophysical measurements having at least one transmitter and at least one receiver array, wherein said receiver array comprises two receivers; and a computing device programmed to split said measurements into a first component and a second component, focus said first component with a first focusing method, focus said second component with a second focusing method, and combine the results from said focusing methods to produce a total focused measurement.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Although described primarily with reference to induction well log focusing, with some modifications, as will be obvious to those skilled in the art, the methodology of using a "base" response plus a "residual" can also be applied to other data processing challenges, such as deviated well processing and other tool data processing.

Although described primarily with reference to on-shore exploration, the methods described herein could be applied equally well to maritime exploration.

Furthermore, although described using modeled or estimated inputs for the background, other measurements could be taken as the background. Such measurements include, but are not limited to, information determined using nuclear magnetic resonance (NMR) surveys.

Furthermore, in another modification of the present teachings, the inhomogeneous background-focusing method can be used with multiple iterations.

What is claimed is:

1. A method for determining conductivity of earth formations, comprising:
   (a) estimating a background formation model from borehole corrected data;
   (b) obtaining a modeled response for said background model giving a modeled response;

(c) making corrections to said modeled response giving a skin-effect corrected response;

(d) calculating a response residual as a difference between the skin-effect corrected response and the borehole corrected data;

(e) focusing said residual giving a focused residual;

(f) calculating an idealized focused result for said background model; and (g) combining the results of said focusing of said residual with said ideal focused results.

2. The method of claim 1, wherein said response residual is smaller than said modeled response.

3. The method of claim 1 wherein focusing said residual further comprises using linear focusing.

4. The method of claim 1 further comprising performing a Vertical Resolution Matching process to said combined results.

5. A system for making geophysical measurements, comprising:

(a) a logging tool to make geophysical measurements having at least one transmitter and at least one receiver array; and (b) a computing device programmed to
  (i) estimate an background formation model from said geophysical measurements;
  (ii) obtaining a modeled response for said background model, giving a modeled response;
  (iii) making skin-effect corrections for said modeled response giving a skin-effect corrected response;
  (iv) a calculating a response residual as a difference between the skin-effect corrected response and borehole corrected geophysical measurements;
  (v) focusing said residual giving a focused residual;
  (vi) calculating an idealized focused result for said background model; and
  (vii) combining the results of said focusing of said residual with said ideal focused results.

6. The system of claim 5, wherein said logging tool is an induction logging tool and said transmitter comprises a coil through which alternating current passes.

7. The system of claim 5, further comprising a telemetry/signal processing unit to transmit said measurements from said logging tool to said computing device.

8. The system of claim 5, wherein said computing device is located remote from said logging tool.

9. The system of claim 5, wherein said computing device is located near the earth's surface.

* * * * *